F. D. HARMAN.
TIRE DEFLATION SIGNAL.
APPLICATION FILED DEC. 26, 1919.
1,410,297.
Patented Mar. 21, 1922.
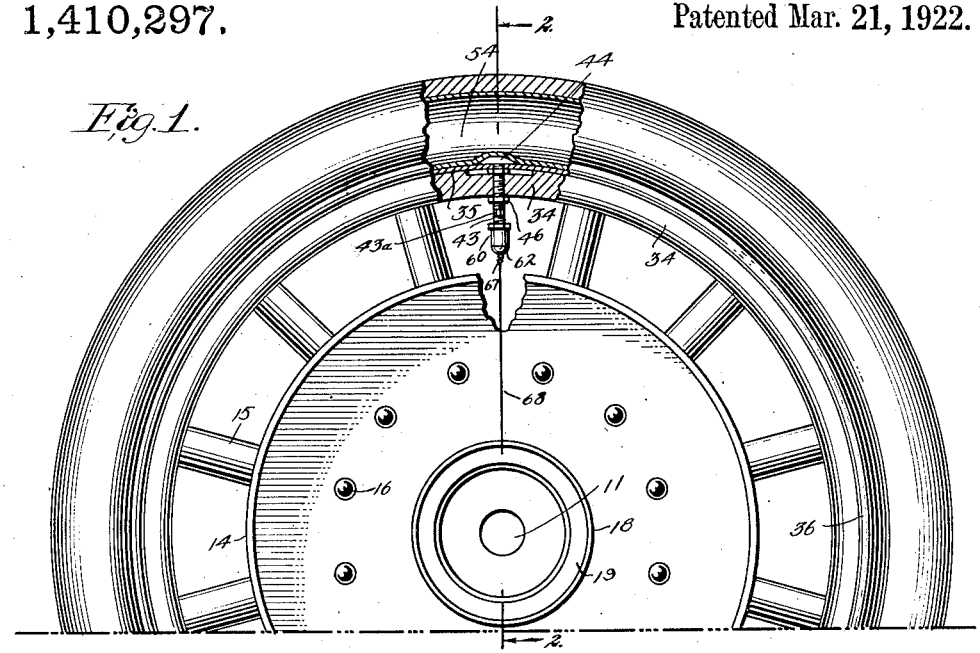
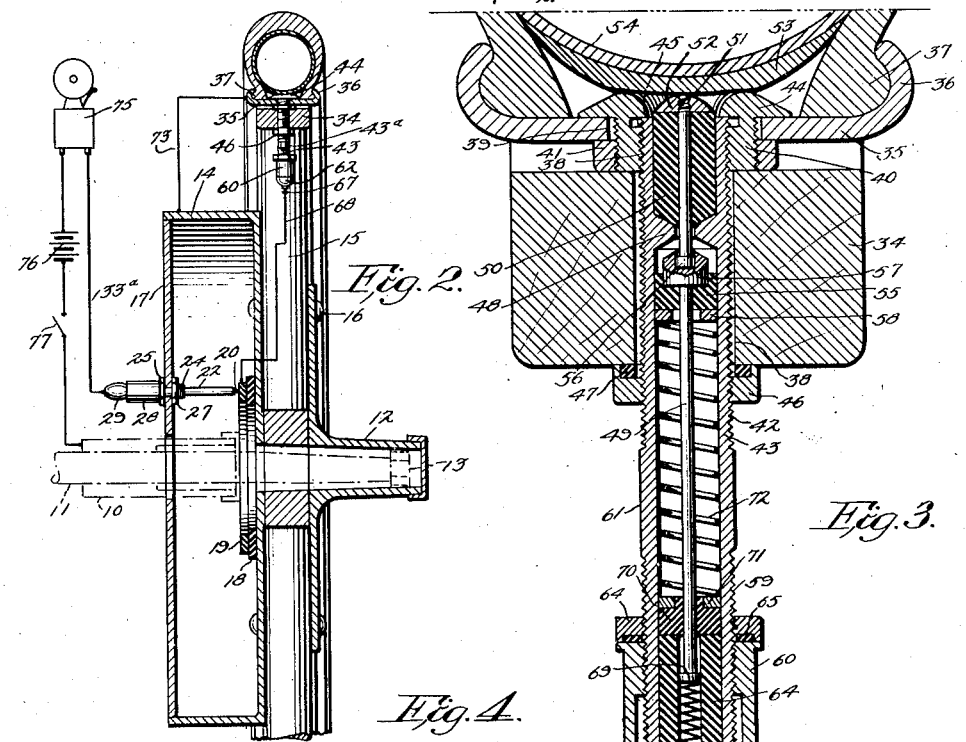
WITNESSES
INVENTOR
F. D. HARMAN
BY
ATTORNEYS

UNITED STATES PATENT OFFICE.

FRED D. HARMAN, OF CEDAR FALLS, WASHINGTON.

TIRE-DEFLATION SIGNAL.

1,410,297.     Specification of Letters Patent.     Patented Mar. 21, 1922.

Application filed December 26, 1919. Serial No. 347,368.

*To all whom it may concern:*

Be it known that I, FRED D. HARMAN, a citizen of the United States, and a resident of Cedar Falls, in the county of King and State of Washington, have invented a new and Improved Tire - Deflation Signal, of which the following is a full, clear, and exact description.

This invention relates to tire signals, and has reference more particularly to an electric signal adapted to indicate deflation in a pneumatic vehicle tire.

Previous to my invention, attempts have been made to constrict devices for sounding an alarm when a pneumatic tire has become deflated to a predetermined point, under inflation being a serious condition in such tires, but these devices however have been either too complicated or not universal enough in their application to various types of wheels and rims, especially demountable rims.

The object of this invention is to provide a device of the class described whose adjustment will not be disturbed when a tire is changed on the wheel.

Reference is to be had to the accompanying drawing forming a part of this specification in which it is understood that the drawing is merely illustrative of one example of the invention, and in which—

Figure 1 is an elevation of the rear wheel of an automobile with parts broken away to disclose the construction of my improved signal device.

Figure 2 is a section through Figure 1 on the line 2—2.

Figure 3 is a sectional view on a large scale through the improved signaling device.

Figure 4 is a sectional view through the contact brush holder.

Referring to the accompanying drawing by numerals, 10 indicates the frame work of any vehicle such as an automobile, which serves as a journal for the axle 11. The hub 12 of a wheel is secured to the axle 11 by any suitable means such as a nut 13. A brake drum 14 is fixed to the spokes 15 of the wheel, preferably by means of rivets 16. A stationary disc 17 is fixed to the frame work 10, and is fitted co-axially in the brake drum 14 so as to prevent dust from entering the interior of said brake drum. Fixed co-axially to the inside of the brake drum 14 is a ring of insulation 18, which supports and is fixed to a slip ring 19 of any material which is a good electrical conductor. Any suitable means may be used for making contact with the slip ring 19, such as a brush 20 which is slidably mounted in a sleeve 21 of any electrical conducting material. The sleeve 21 is enclosed by an insulating sleeve 22 which terminates at one end in an annular shoulder 23. A threaded bushing 24 supports the sleeve 22 and is provided on one end with a nut 25, said bushing having an internal diameter substantially that of the outside diameter of the sleeve 22. The bushing 24 extends through a hole 26 in the disc 17, and is secured thereto by a lock nut 27. Fitted securely to the shoulder 23 is a cylindrical member 28 which serves as a support for the connection plug 29 which is fixed co-axially in said cylindrical member by means of pins 30. A spindle 31 is fitted tightly to and co-axially with the connection plug 29, and is loosely fitted in the sleeve 21. This spindle is made of any good conducting material and is connected electrically to the brush 20 by means of a spring 32, said spring also serving to force the brush 20 axially against the slip ring 19. A hole 33 passes co-axially through the plug 29 so that an electric wire 33$^a$ may be inserted therein and connected with the spindle 31.

The felly 34 of the wheel is provided with a rim 35, having outstanding annular flanges 36 which grip the beads 37 of a pneumatic tire, and serve to secure said tire to said rim. A diametrical hole 38 is provided in the felly 34 and a hole 39, larger in diameter than the hole 38, is provided in the rim 35, which is adapted to loosely fit a bushing 40, said bushing being threaded externally so as to engage a nut 41, and internally so as to engage the external threads 42 of a tube 43. The bushing 40 is provided at one end with an irregularly shaped annular shoulder 44, which co-operating with the nut 41, secures said bushing to the rim 35. The axial and rotatable movement of the tube 43 in the bushing 40 is limited by an internal annular shoulder 45. The tube 43 is somewhat smaller than the hole 38 in the felly and passes therethrough. A nut 46 engages the threads 42 and bears on the inside of the felly 34 opposite the bushing 40 so that said felly is securely held between said nut 46 and said bushing. The surface of the nut 46 which bears on the felly 34 is provided with a washer 47 of any resilient material which will serve to keep water and mud from the inside of the hole 38. An internal annular shoulder 48 is formed on the inside of the tube 43 whose internal diameter is larger than the external diameter of a spindle 49 which passes therethrough so that no electrical contact will take place between said shoulder and said spindle. An insulating plug 50 is tightly fitted to the inside of the tube 43 adjacent the bushing 40, and is provided with a longitudinal hole through which passes the spindle 49, said hole being slightly larger in diameter than said spindle so that said spindle may reciprocate axially in said hole.

The end of the spindle 49 adjacent the bushing 40 is provided with screw threads 51 which engage a washer 52, one surface of which is arcuate in cross section and engages the liner 53, which protects the inner pneumatic tube 54. The washer 52 is somewhat smaller in diameter than the shoulder 45 so that no electrical contact will take place between said washer and said shoulder. Loosely fitted to the inside of the tube 43 on the side of the shoulder 48 opposite the plug 50, is an insulating cylinder 55 through which passes the spindle 49. The spindle 49 is provided with an annular shoulder 56 adjacent the cylinder 55 which is tightly fitted in a contact 57. The contact 57 is loosely set in a recess in the cylinder 55 and serves to engage said cylinder and limit the axial movement of the spindle 49 in said cylinder. A contact washer 58 bears against the surface of the cylinder 55 opposite the contact 57, and is substantially the same diameter as said cylinder. The internal diameter of the washer 58 is considerably larger than the spindle 49, so that no electrical contact will take place between said washer and said spindle.

The end of the tube 43 opposite the bushing 40 is provided with threads 59 which engage similar internal threads on a cylinder 60. A shoulder 61 is formed on the outside of the tube 43 between the threads 42 and the threads 59, said shoulder being provided with flats 43$^a$ adapted to engage a wrench so that said tube 43 may be unscrewed from the bushing 40. The cylinder 60 is provided with internal threads 60$^a$ at one end which engage similar threads on an insulating plug 62, and the axial movement of said plug in said cylinder is limited by an annular shoulder 63 formed on said plug. The end 64 of the plug opposite the threads 60$^a$ has an external diameter smaller than the internal diameter of the tube 43, so that said end may be easily rotated in said tube 43. The cylinder 60 may be locked in any axial position on the tube 43 by means of a lock nut which engages the threads 59. The surface of the lock nut 64 which bears on the cylinder 60 is provided with a washer 65 of any resilient material which will serve to prevent water and mud from entering the interior of the cylinder 60. A hole 66 passes longitudinally through and co-axially with the plug 62, and is threaded at one end so as to engage a terminal plug 66$^a$. A screw 67 is provided in the end of the terminal plug 66$^a$ which is adapted to secure an electric wire 68 to said terminal plug. The end of the spindle opposite the washer 52 is provided with an annular shoulder 69 which is loosely fitted in the hole 66 so that the spindle 49 may have an axial movement in said hole. An insulating cylinder 70 substantially the same size as the end 64, and bearing on the inner surface thereof, is provided with a longitudinal hole in which is loosely fitted the spindle 49. The insulating cylinder 70 serves to insulate a contact washer 71 for the spindle 49, said washer being substantially the same diameter as the cylinder 70, so as to be free to move axially in the tube 43. A coil spring 72 connects the washers 58 and 71, and is of an internal diameter considerably larger than the spindle 49, so that no electrical contact will take place between said spring and said spindle. The spring 72 serves to forcibly press the washer 52 against the liner 53 in opposition to the air pressure in the pneumatic tube 54. When the air pressure in the inner tube 54 falls below a predetermined point which is determined by the expanding forces in the spring 72, said spring will force the contact 57 into electrical contact with the shoulder 48 so that a current will pass through an electrical circuit to be hereinafter described, thus operating an audible or visible signal which will indicate to the driver of a car that the pressure in the tire has fallen below the predetermined point. The aforementioned circuit is formed by a wire 73 which connects the metal rim 35 with the brake drum 14, and said brake drum is grounded on the frame work 10 of the machine. The electric wire 68 connects the terminal plug 66 with the contact ring 19. The wire 33$^a$ connects the spindle 31 with the frame 10 of the machine, and includes some warning signal means such as an electric bell 75, a battery 76, and a switch 77. The switch 77 is provided to break the circuit after the alarm has been given by the electric bell 75.

While I have shown my device applied to a wheel with wooden spokes, any other type of wheel may be used such as the common wheel with wire spokes in which it will be unnecessary to use the wire 73, as the rim 35 will be grounded on the frame 10 by means of said wire spokes.

When the automobile is running, the switch 77 is normally closed so that the signal may be operated when the tire becomes deflated to a predetermined point. When this point is reached, the spring 72 overcomes the pressure of the air in the inner tube 54, and the spindle 49, the washer 58, the cylinder 55, and the contact 57 are moved axially by said spring until said contact makes electrical contact with the shoulder 48, so that current will pass through the circuit and ring the bell 75. When it is desired to repair, clean, or replace the brush 20, the nut 25 may be unscrewed so that said brush may be easily removed. While I have indicated the bell 75 as a signal device, an electric light may be used, and in this case, a light could be used for each wheel so that the driver could tell at a glance which of his tires has become deflated.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a tire deflation signal, the combination with a wheel having an opening in its felly and provided with an internally threaded bushing in said opening, of a tube of conducting material and having one end externally screw-threaded and screwed into the bushing, said tube being provided with an annular internal shoulder forming a contact, a plunger mounted in the tube and insulated therefrom, said plunger carrying a contact for engaging the shoulder of the tube, said plunger projecting beyond the end of the tube, a spring in the tube and pressing upon the plunger, a spring adjusting means on the other end of the tube and carrying a terminal, and a connection between the terminal and the plunger.

2. A circuit closer for a tire deflation signal, comprising a tube having at its upper end means for securing it to a felly of a wheel and provided adjacent its upper end with an annular internal shoulder forming a contact, a cylindrical member adjustably secured to the lower end of the tube, an insulating plug carried by the said member and extending into the tube, said plug having a central bore, a spring pressed stem mounted in the tube and having its upper end projecting beyond the tube and its lower end extending into the bore of the said plug, the said stem carrying a contact for engaging the contact shoulder of the tube, insulating means in the tube for the upper end of the stem, a terminal secured in the bore of the plug, and a spring in the bore of the plug between the stem and terminal.

3. A circuit closer for a tire deflation signal, comprising a tube having at its upper end means for securing it to a felly of a wheel, the tube having in its upper end an annular internal shoulder forming a contact, insulating plugs in the tube above and below the shoulder thereof, a cylindrical member adjustably mounted on the lower end of the tube, an insulating plug carried by the said member and extending into the tube and having a bore, a stem in the tube and having its upper end extending through the upper plugs and extending into the body of the lower plug, the stem being provided with a contact below the shoulder contact of the tube, a spring in the tube between the plug below the shoulder of the tube and the plug carried by the cylindrical member, a terminal mounted in the bore of the lower plug, and a spring in said bore between the stem and terminal.

FRED D. HARMAN.